United States Patent
Ootsuka

(10) Patent No.: US 9,991,058 B2
(45) Date of Patent: Jun. 5, 2018

(54) METHOD FOR MANUFACTURING SOLAR CELL

(71) Applicant: SEKISUI CHEMICAL CO., LTD., Osaka (JP)

(72) Inventor: Tomohiro Ootsuka, Kumagaya (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days. days.

(21) Appl. No.: 15/326,815

(22) PCT Filed: Jul. 30, 2015

(86) PCT No.: PCT/JP2015/071706
§ 371 (c)(1),
(2) Date: Jan. 17, 2017

(87) PCT Pub. No.: WO2016/017776
PCT Pub. Date: Feb. 4, 2016

(65) Prior Publication Data
US 2017/0213654 A1    Jul. 27, 2017

(30) Foreign Application Priority Data
Jul. 30, 2014 (JP) ................................. 2014-155576

(51) Int. Cl.
*H01G 9/20* (2006.01)
*H01G 9/00* (2006.01)

(52) U.S. Cl.
CPC ......... *H01G 9/2077* (2013.01); *H01G 9/0029* (2013.01); *H01G 9/2013* (2013.01); *H01G 9/2059* (2013.01); *Y02E 10/542* (2013.01)

(58) Field of Classification Search
None
See application file for complete search history.

(56) References Cited

U.S. PATENT DOCUMENTS

2011/0240110 A1* 10/2011 Kang .................. H01G 9/2059
136/256
2011/0272007 A1* 11/2011 Kang .................. H01G 9/2022
136/252
(Continued)

FOREIGN PATENT DOCUMENTS

EP    1 923 896 A1    5/2008
EP    2 461 419 A1    6/2012
(Continued)

OTHER PUBLICATIONS

International Search Report issued with respect to Application No. PCT/JP2015/071706, dated Oct. 13, 2015.
(Continued)

*Primary Examiner* — Asok K Sarkar
(74) *Attorney, Agent, or Firm* — Greenblum & Bernstein, P.L.C.

(57) ABSTRACT

A method for producing a solar cell, including: an electrolyte-supplying step of supplying an electrolyte onto a plate-shaped first electrode at a region thereof positioned between a pair of first sealing portions respectively provided along two opposing lateral sides of the plate-shaped first electrode; an electrodes-laminating step of superposing a second electrode on the first electrode gradually from one end side toward the other end side as viewed in a direction along the lateral sides of the first electrode while bonding the second electrode to the first electrode at the first sealing portions, the second electrode including a flexible plate-shaped substrate having a hole penetrating through the substrate in a thicknesswise direction thereof and capable of discharging the electrolyte therethrough; and a sealing step of bonding the first electrode and the second electrode at a pair of second sealing portions.

4 Claims, 8 Drawing Sheets

(56) References Cited

U.S. PATENT DOCUMENTS

| | | | | |
|---|---|---|---|---|
| 2012/0125422 A1* | 5/2012 | Kang | ................... | H01G 9/2009 |
| | | | | 136/256 |
| 2012/0186645 A1* | 7/2012 | Shin | ....................... | H01G 9/209 |
| | | | | 136/256 |
| 2014/0251433 A1* | 9/2014 | Cha | ...................... | H01G 9/2004 |
| | | | | 136/263 |
| 2014/0373921 A1* | 12/2014 | Holliman | ............. | H01G 9/2059 |
| | | | | 136/263 |
| 2016/0217936 A1* | 7/2016 | Fukui | .................. | H01L 51/0072 |

FOREIGN PATENT DOCUMENTS

| | | | |
|---|---|---|---|
| JP | 2007-220608 | A | 8/2007 |
| JP | 2007-287483 | A | 11/2007 |
| JP | 2008-130537 | A | 6/2008 |
| JP | 2011-204522 | A | 10/2011 |
| JP | 2012-209139 | A | 10/2012 |
| JP | 2014-63565 | A | 4/2014 |

OTHER PUBLICATIONS

International Preliminary Report on Patentability issued with respect to Application No. PCT/JP2015/071706, dated Jan. 31, 2017.

* cited by examiner

METHOD FOR MANUFACTURING SOLAR CELL

TECHNICAL FIELD

The present invention relates to a method for manufacturing a solar cell.

Priority is claimed on Japanese Patent Application No. 2014-155576, filed Jul. 30, 2014, the contents of which are incorporated herein by reference.

BACKGROUND ART

As a conventional method for manufacturing a solar cell, a method has been disclosed as in the patent document described below in which a first electrode formed into a plate-shape and a second electrode are superposed upon each other such that these electrodes face each other, and the periphery of the resulting is bonded by a sealing material, followed by injection of an electrolytic liquid.

PRIOR ART REFERENCES

Patent Document

Patent Document 1: Japanese Unexamined Patent Application Publication No. 2011-204522

SUMMARY OF THE INVENTION

Problem to be Solved by the Invention

However, in the conventional method for manufacturing a solar cell in which an electrolytic liquid is injected after bonding the periphery with a conventional sealing material, a problem arises that bubbles are likely to remain in the space filled with the electrolytic liquid, thereby lowering the quality of the solar cell.

In view of the aforementioned situation, the present invention provides a method which enables to manufacture a solar cell while preventing the bubbles from remaining in a space filled with an electrolyte which is in a state of liquid or the like.

Means for Solving Problem

The method for producing a solar cell according to one embodiment of the present invention comprises: an electrolyte-supplying step of supplying an electrolyte on a plate-shaped first electrode at a region thereof positioned between a pair of first sealing portions respectively provided along two opposing lateral sides of the plate-shaped first electrode; an electrodes-laminating step of superposing a second electrode on the first electrode gradually from one end side toward the other end side as viewed in a direction along the lateral sides of the first electrode while bonding the second electrode to the first electrode at the first sealing portions, thereby obtaining a laminate, the second electrode comprising a flexible plate-shaped substrate having a hole penetrating through the substrate in a thicknesswise direction thereof and capable of discharging the electrolyte therethrough; and a sealing step of attaching the first electrode and the second electrode at a pair of second sealing portions which extend between the first sealing portions in a direction traversing the lateral sides of the first electrode and are provided with an interval as viewed in a direction along the lateral sides, thereby sealing a space filled with the electrolyte in the laminate, the hole being provided at a position which is outside of a region between the second sealing portions.

In the present invention; the "electrolyte" means a liquid or semi-solid electrolyte.

The method having these features enables to expel the entrapped bubbles from the electrolyte.

In the sealing step of the method of the present invention, after the first electrode and the second electrode are bonded together at the second sealing portions, the resulting may be cut while leaving at least a part of the second sealing portions.

This feature enables to complete a solar cell while omitting a post-treatment to remove the electrolyte discharged from the through-hole which may be necessitated after lamination of the first electrode and the second electrode.

The method for producing a solar cell according to another embodiment of the present invention comprises: an electrolyte-supplying step of supplying an electrolyte on a plate-shaped first electrode at a region thereof positioned between a pair of first sealing portions respectively provided along two opposing lateral sides of the plate-shaped first electrode; an electrodes-laminating step of superposing a second electrode on the first electrode gradually from one end side toward the other end side as viewed in a direction along the lateral sides of the first electrode bonding the second electrode to the first electrode at the first sealing portions, thereby obtaining a laminate, the second electrode comprising a flexible plate-shaped substrate having a hole penetrating through the substrate in a thicknesswise direction thereof and capable of discharging the electrolyte therethrough; and a sealing step of bonding the first electrode to the second electrode at a pair of second sealing portions which extend between the first sealing portions in a direction traversing the lateral sides of the first electrode and are provided with an interval as viewed in a direction along the lateral sides, thereby sealing a space filled with the electrolyte in the laminate, the hole being positioned at a region between the pair of the second sealing portions and to be sealed after the first electrode and the second electrode are superposed.

The method having these features enables to expel the entrapped bubbles from the electrolyte.

In the method of the present invention, the first sealing portions may be sealing materials provided along the two opposing lateral sides of the plate-shaped first electrode.

By this feature, the first sealing portions can be easily provided.

Effect of the Invention

The present invention has an effect that a high-quality solar cell can be manufactured while preventing the bubbles from remaining in a space filled with an electrolyte.

MODE(S) FOR CARRYING OUT THE INVENTION

Hereinbelow, the method of the present invention for manufacturing a solar cell is described with reference to the drawings.

Figure 1:
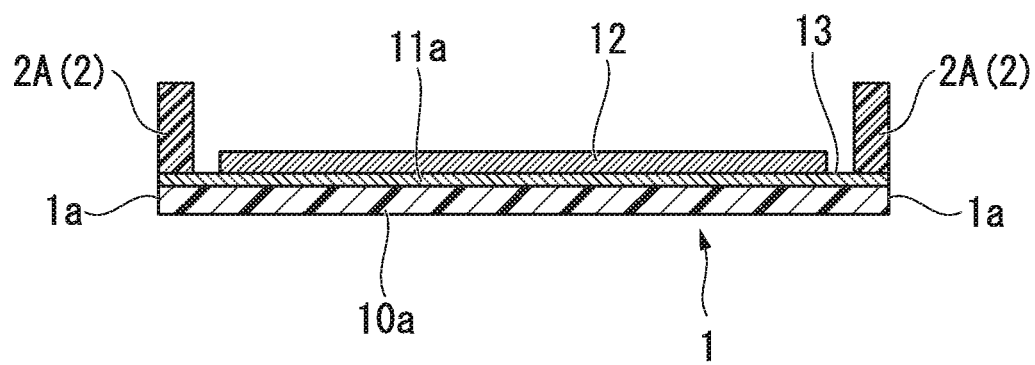
FIG. 1 is a schematic cross-sectional view showing one step of the method for manufacturing a solar cell according to one embodiment of the present invention.
Figure 2:
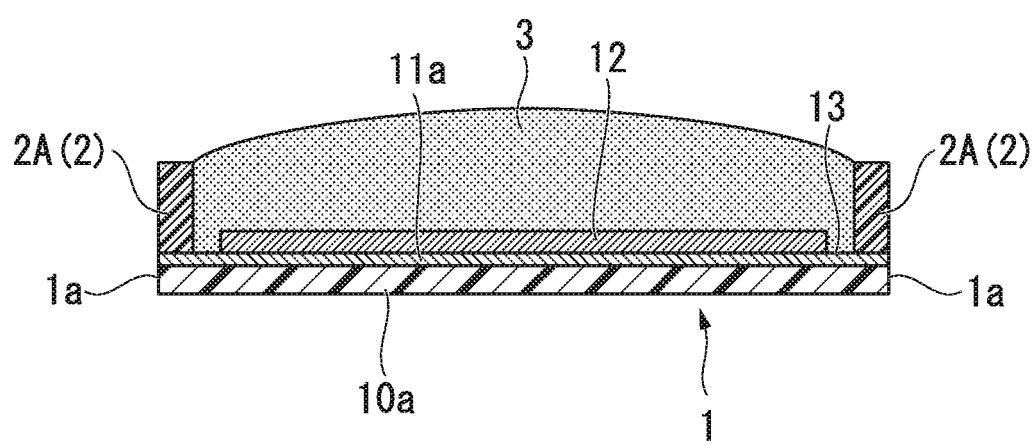
FIG. 2 is a schematic cross-sectional view showing one step of the method for manufacturing a solar cell according to one embodiment of the present invention.
Figure 3:
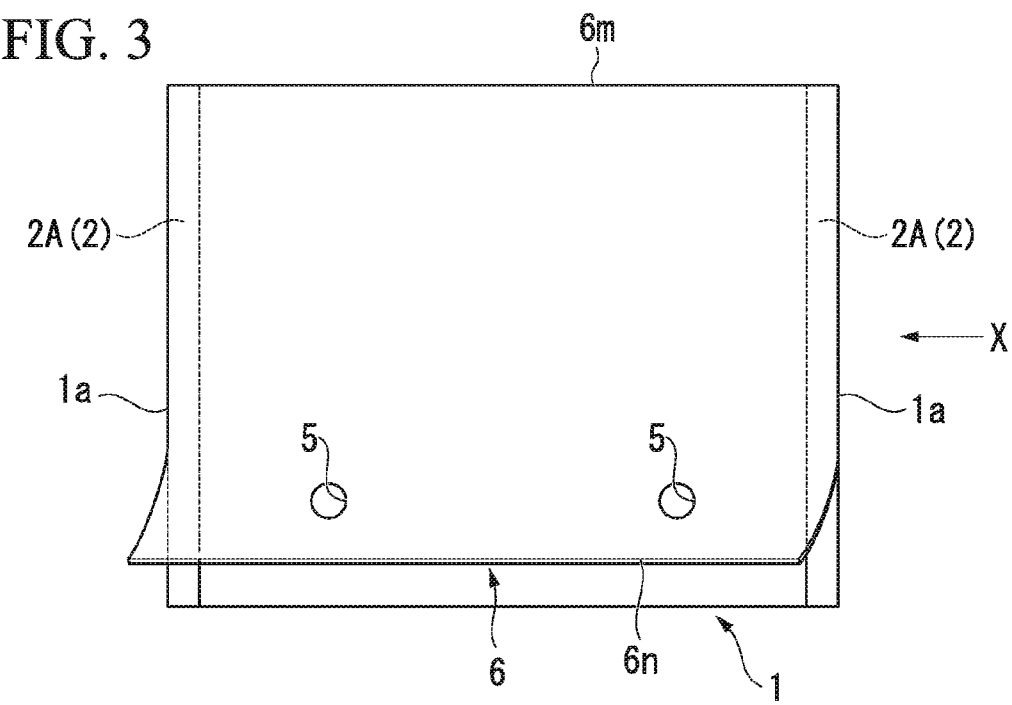
FIG. 3 is a schematic plan view showing one step of the method for manufacturing a solar cell according to one embodiment of the present invention.
Figure 4:
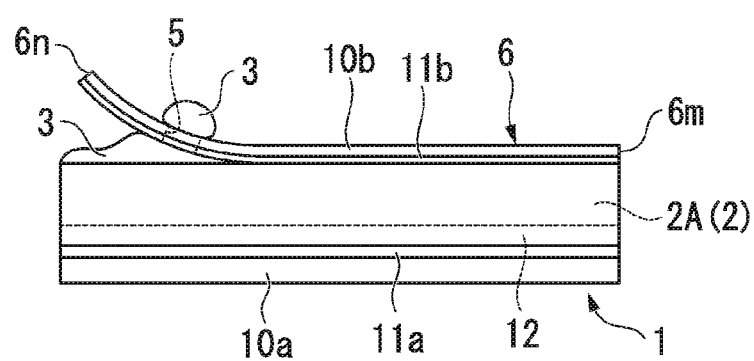
FIG. 4 is a side view of FIG. 3 as viewed from the direction of arrow X.
Figure 5:
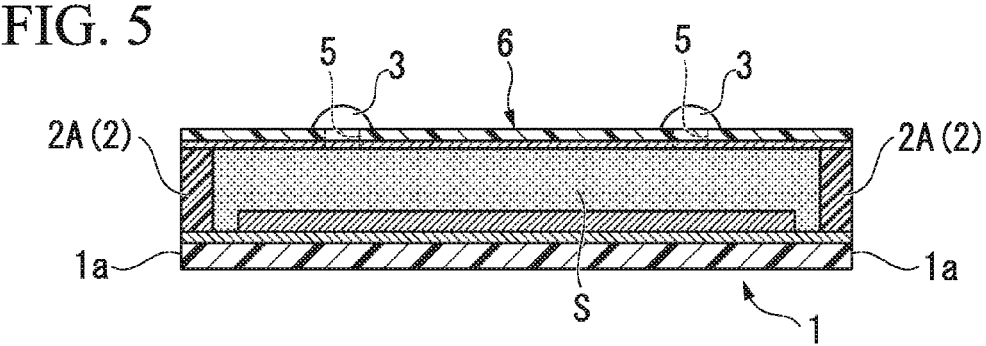
FIG. 5 is a schematic cross-sectional view showing one step of the method for manufacturing a solar cell according to one embodiment of the present invention.
Figure 6:
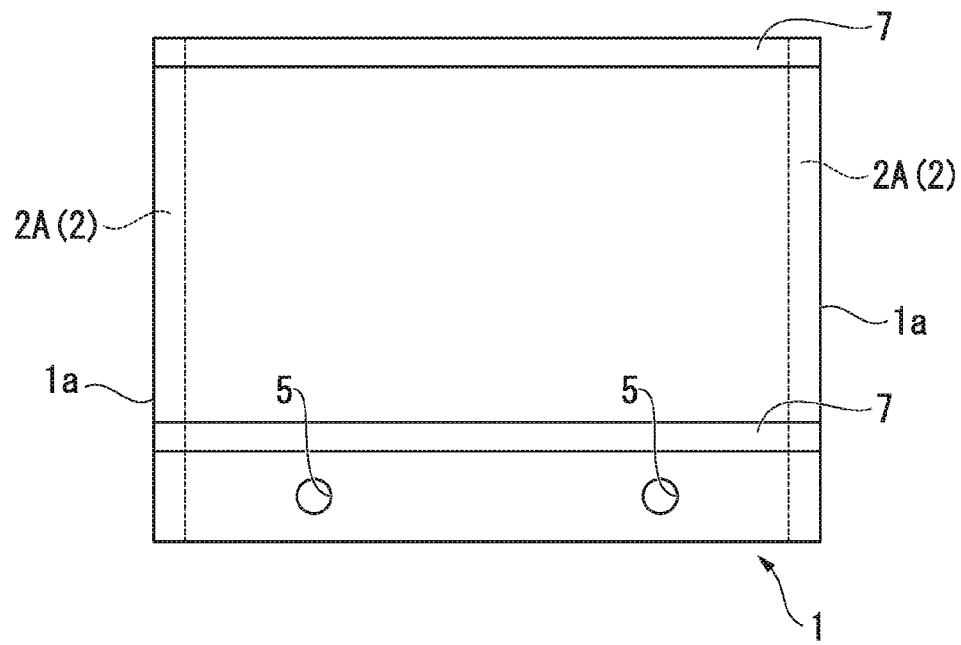
FIG. 6 is a schematic plan view showing one step of the method for manufacturing a solar cell according to one embodiment of the present invention.
Figure 7:
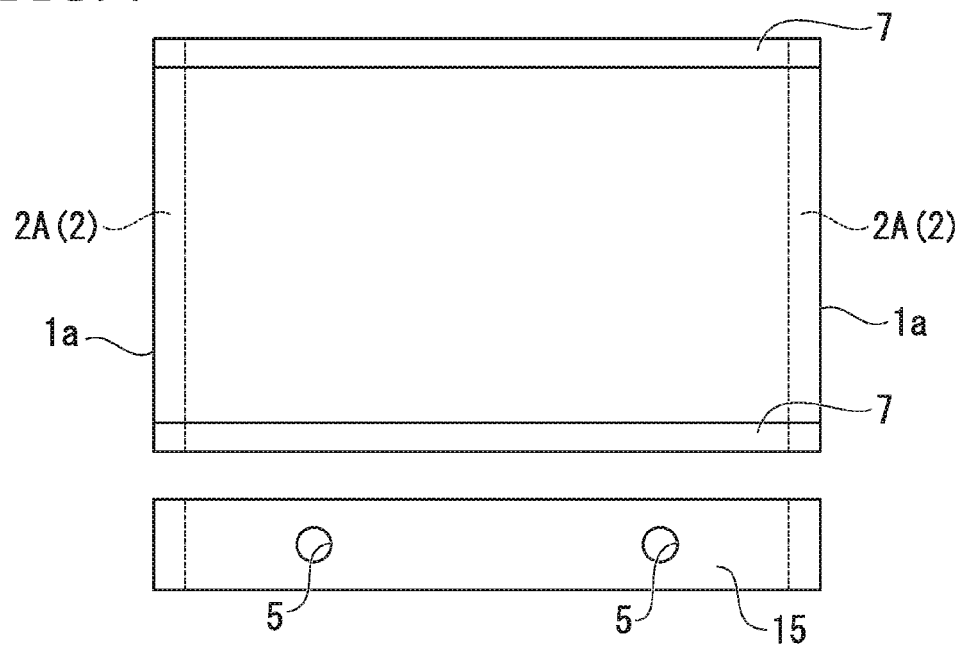
FIG. 7 is a schematic plan view showing one step of the method for manufacturing a solar cell according to one embodiment of the present invention.

The method for manufacturing a solar cell according to the present embodiment comprises:

(1) an electrolyte-supplying step as shown in FIG. 1 and FIG. 2 for supplying an electrolyte on a plate-shaped first electrode 1 at a region thereof positioned between a pair of first sealing portions 2A,2A respectively provided along two opposing lateral sides 1a,1a of the plate-shaped first electrode 1;

(2) an electrodes-laminating step as shown in FIG. 3 and FIG. 4 for superposing a second electrode 6 on the first electrode 1 gradually from one end 6m side toward the other end 6n side as viewed in a direction along the lateral sides 1a,1a of the first electrode 1 while bonding the second electrode 6 to the first electrode 1 at the first sealing portions 2,2, thereby obtaining a laminate, the second electrode 6 comprising a flexible plate-shaped substrate 10b having a hole 5 penetrating through the substrate 10b in a thicknesswise direction thereof and capable of discharging the electrolyte 3 therethrough; and (3) a sealing step as shown in FIG. 5 to FIG. 7 for bonding the first electrode 1 to the second electrode 6 at a pair of second sealing portions 7,7 which extend between the first sealing portions 2,2 in a direction traversing the lateral sides 1a,1a of the first electrode 1 and are provided with an interval as viewed in a direction along the lateral sides 1a,1a, thereby sealing a space S filled with the electrolyte 3 in the laminate, the hole 5 being provided at a position which is outside of a region between the second sealing portions 7,7.

(1) Step for Charging Electrolyte 3

In the step for charging an electrolyte 3, as shown in FIG. 2, an electrolyte 3 which is in a liquid, semisolid or solid form is provided on a plate-shaped first electrode 1 at a region thereof positioned between a pair of first sealing portions 2,2 respectively provided along two opposing lateral sides 1a,1a of the plate-shaped first electrode 1.

The first electrode 1 is preferably an electrode formed by a method in which a conductive film 11a is formed on the surface of a substrate 10a, and a semiconductor layer 12 is formed on the surface of the conductive film 11a.

It is preferable that the first electrode 1 has an approximate square shape.

As a material of the substrate 10a used in the first electrode 1, for example, a resin material composed mainly of a transparent thermoplastic resin material such as polyethylene naphthalate (PEN) and polyethylene terephthalate (PET), or a glass substrate or the like can be suitably used. The substrate 10a is preferably in the form of a flexible film.

As the material of the conductive film 11a, for example, it is possible to use tin-doped indium oxide (ITO), zinc oxide, fluorine-doped tin oxide (FTO), aluminum-doped zinc oxide (AZO), tin oxide (SnO), antimony-doped tin oxide (ATO), indium oxide/zinc oxide (IZO), a gallium-doped zinc oxide (GZO), or the like.

The semiconductor layer 12 has a function to receive and transport electrons from the sensitizing dye to be described later, and is a film of a semiconductor composed of a metal oxide, an organic metal or the like formed on the surface of the conductive film 11a.

As the metal oxide, for example, titanium oxide ($TiO_2$), zinc oxide (ZnO), tin oxide ($SnO_2$) or the like can be used. As the organic metal, organic metal compounds such as a compound having the perovskite structure, e.g., a structure represented by $CH_3NH_3PbX_3$ (wherein X is a halogen atom), can be used.

The semiconductor layer 12 is one capable of carrying a sensitizing dye thereon. The sensitizing dye to be carried on the semiconductor layer 12 is composed of an organic dye or a metal complex dye. As the organic dye, for example, various organic dyes such as a coumarin-type dye, a polyene-type dye, a cyanine-type dye, a hemicyanine-type dye, and a thiophene-type dye can be used. As the metal complex dye, for example, ruthenium complexes and the like can be suitably used.

The sealing materials 2A,2A in a pair are provided so as to continuously extend along the lateral sides 1a,1a in the depth direction of the drawing on both widthwise ends of the substrate 10a (i.e., direction intersecting the lateral sides 1a,1a extending in the depth direction of the drawing).

As the sealing material 2A, an adhesive (e.g., a hot melt resin), a curable resin or the like can be preferably used.

Specifically, it is preferable that the sealing material 2A having a predetermined thickness is provided on the surface of the conductive film 11a of the first electrode 1 to thereby form a dent 13 to be filled with a liquid or semisolid electrolyte 3. Thus, a pair of the sealing materials 2A,2A which oppose to each other serve as side walls to prevent the electrolyte 3 from dropping down to both widthwise sides of the first electrode 1. Further, the sealing materials 2A,2A provided on the first electrode 1 at both widthwise ends constitute the first sealing portions 2,2 for sealing the first electrode 1 and the second electrode 6 at both widthwise ends thereof along the direction of lateral sides 1a,1a.

The electrolyte 3 is supplied to a region between the sealing materials 2A,2A of the first electrode 1, i.e., a region between the first sealing portions 2, 2. The electrolyte 3 is supplied in a larger amount than finally sealed between the first electrode 1 and the second electrode 6, which, however, is at a level such that the electrolyte 2 would not overflow out of a region between the first sealing portions 2, 2. For this purpose, as shown in FIG. 2, the electrolyte 3 is supplied in an amount such that the surface of the electrolyte 3 is slightly above the line connecting the top ends of the sealing material 2A,2A.

As the electrolyte 3, for example, it is possible to use non-aqueous solvents such as acetonitrile, and propionitrile; and solvents formed by mixing a supporting electrolyte (such as lithium iodide) and iodine into a liquid component such as an ionic liquid (e.g., dimethylpropylimidazolium Iodide or butylmethylimidazolium iodide. For preventing reverse electron transfer reaction, the electrolyte 3 may also contain t-butylpyridine.

(2) Step of Bonding the First Electrode 1 to the Second Electrode 6 at the First Sealing Portions 2,2

As shown in FIG. 3 and FIG. 4, in the step of bonding the first electrode 1 to the second electrode 6 at the first sealing portions 2,2, the first electrode 1 is superposed on the second electrode 6 gradually from one end 6m side toward the other end 6n side as viewed in a direction along the lateral sides 1a,1a of the first electrode 1 while bonding the second electrode 6 to the first electrode 1 at the first sealing portions 2,2, thereby obtaining a laminate. The second electrode 6 has a hole 5 penetrating therethrough in a thicknesswise direction thereof and is capable of discharging the electrolyte 3 therethrough.

The second electrode 6 is formed by forming a conductive film 11b on a substrate 10b.

The material and shape of the substrate 10b may be approximately the same as in the substrate 10a of the first electrode 1, except that the substrate 10b has a hole 5 in a thicknesswise direction thereof and has flexibility.

The conductive film 11b of the second electrode 6 may be made of either a material functionable as the conductive film 11b but not functionable as a catalyst layer (not shown) or a material functionable both as the conductive film 11b and as the catalyst layer (not shown). In the former case, the catalyst layer (not shown) may be further formed on the conductive film 11b. In the latter case, only the conductive film 11b may be formed on the substrate 10b.

As the material of the catalyst layer formed on the surface of the conductive film 11b, it is possible to use a carbon paste, a platinum and the like.

At least one of the substrate 10a of the first electrode 1 and the substrate 10b of the second electrode 6 is a transparent substrate.

Further, at least one of the conductive films 11a,11b of the first electrode 1 and the second electrode 6 is a transparent conductive film.

The bonding of the second electrode 6 to the first electrode 1 is performed as follows.

That is, as shown in FIG. 3, the second electrode 6 is bonded to the first electrode 1 at one end 6m side, while being lifted at the other end 6n side. A portion of the second electrode 6 in the vicinity of the portion thereof bonded to the first electrode 1 is left in a substantially arc shape. Then, the arc-shaped portion of the second electrode 6 is gradually bonded to the electrode 1 from one end 6m side toward the other end 6n side.

Here, heating, light irradiation or the like is performed depending on the material of the sealing material 2A while pressing down the first sealing portion 2 to thereby bond the first electrode 1 to the second electrode 6 with the sealing material 2A. When the second electrode 6 expands by the volume of the electrolyte 3 present between the first sealing portions 2, 2, the region between the first sealing portions 2, 2 is leveled by a roller or the like a while after pressing the sealing materials 2A, 2A.

Since the electrolyte 3 is disposed between the first sealing portions 2, 2 in an amount slightly larger than finally sealed, as shown in FIG. 4, the electrolyte 3 is pressed from one end 6m side toward the other end 6n side when bonding the second electrode 6 to the first electrode 1. As a result, bubbles entrapped in the space S filled with the electrolyte 3 is expelled along the direction of bonding the second electrode 6 to the first electrode 1, i.e., from one end 6m side toward the other end 6n side. In addition, the excess amount of the electrolyte 3 is expelled from one end 6m side to the other end 6n side.

The hole 5 is positioned in front of a location where the excess amount of the electrode 3 gradually increases as it is expelled from one end 6m side to the other end 6n side in the second electrode 6, and overflows out of the region between the first sealing portions 2,2 (i.e., closer to one end 6m side).

Thus, as shown in FIG. 4 and FIG. 5, the hole 5 serves to discharge the excess amount of the electrolyte 3 supplied between the sealing portions 2, 2 of the first electrode 1, thereby preventing the excess amount of the electrolyte 3 from overflowing to adhere to the adhesion surface of the sealing material 2A forming the first sealing portion 2.

(3) Step of Sealing Space S Filled with Electrolyte 3

As shown in FIG. 5 to FIG. 7, in the step of sealing the space S (see FIG. 5) filled with the electrolyte 3, the first electrode 1 is bonded to the second electrode 6 at a pair of the second sealing portions 7,7 which extend between the first sealing portions 2,2 in a direction traversing the lateral sides 1a,1a of the first electrode 1 and are provided with an interval as viewed in a direction along the lateral sides 1a,1a. Here, the positions of the second sealing portions 7,7 are set such that the hole 5 is provided at a position which is outside of the region between the second sealing portions 7,7.

Specifically, the second sealing portions 7,7 are provided so as to extend in the widthwise direction of the laminate of the first electrode 1 and the second electrode 6 with an interval as viewed in a direction along the lateral sides 1a,1a of the laminate. The first electrode 1 and the second electrode 6 are fusion-bonded to each other at the second sealing portions 7,7 by ultrasonic welding or the like, and the resulting is cut while leaving at least a part of the second sealing portions 7,7, more preferably cut at a position outside the region where the second sealing portion 7 is fusion-bonded.

Thus, by the method for manufacturing a solar cell according to the present embodiment of the present invention, the first electrode 1 which has been filled with the electrolyte 3 at an area positioned between the first sealing portions 2, 2 is laminated along one direction with the second electrode 6 while pressing the electrolyte 3, whereby the first electrode 1 can be laminated with the second electrode 6 while expelling the bubbles entrapped in the space filled with electrolyte 3. Therefore, the method for manufacturing a solar cell according to the present embodiment of the present invention can prevent the lowering of the quality of the solar cell caused by the bubbles remaining in the electrolyte 3 contained in the solar cell.

Further, by the method for manufacturing a solar cell according to the present embodiment of the present invention, the excess amount of the electrolyte 3 is discharged through the holes 5,5 formed in the second electrode 6 before overflowing out of the region between the first sealing portions 2, 2, whereby the presence of the electrolyte 3 between the sealing material 2A and the second electrode 6 can be avoided. Therefore, the method for manufacturing a solar cell according to the present embodiment of the present invention can prevent the lowering of the adhesion strength of the sealing material 2A caused by the adhesion of the electrolyte 3 to the adhesion surface of the sealing material 2A.

Further, by the method for manufacturing a solar cell according to the present embodiment of the present invention, the component parts thereof can be arranged in accordance with the order of lamination, whereby the manufacture can be easily carried out and the continuous production can be readily performed.

Furthermore, by the method for manufacturing a solar cell according to the present embodiment of the present invention, the first electrode 1 and the second electrode 6 are fusion-bonded to each other by ultrasonic welding or the like with the hole 5 positioned outside of the region between the second sealing portions 7,7, thereby enabling to omit a step of closing the hole 5 for discharging the electrolyte 3 and a step of removing the electrolyte 3 adhering to the periphery of the hole 5. Therefore, by the method for manufacturing a solar cell according to the present embodiment of the present invention, a solar cell can be efficiently manufactured. Further, in the method for manufacturing a solar cell according to the present embodiment of the present invention, the end portion 15 where the holes 5 are formed is cut away; therefore, the marks of closure of the holes 5 would not be left, so that it is possible to manufacture a solar cell having an excellent appearance.

Figure 11A:
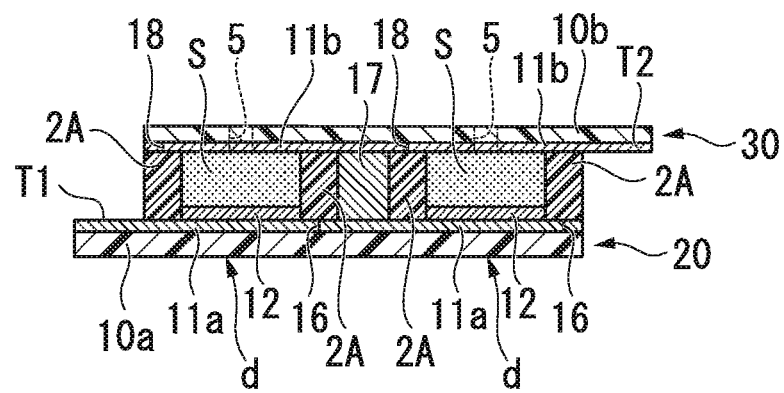
FIG. 11A is a schematic view showing one step of the method for manufacturing a solar cell according to one embodiment of the present invention, and showing the cross-section of a solar cell being manufactured.
Figure 11B:
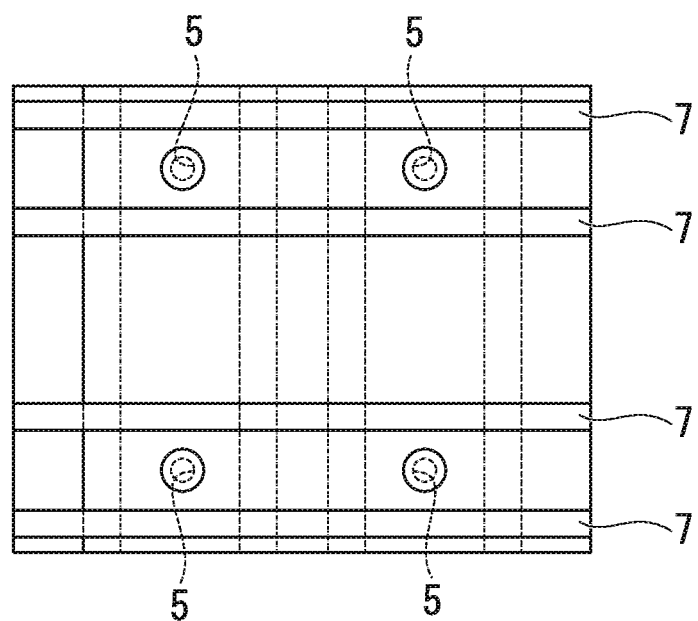
FIG. 11B is a cross-sectional view of a solar cell being manufactured as shown in FIG. 11A.

Next, a second embodiment of the present invention will be described with reference to FIGS. 8 (A and B) through FIGS. 11 (A and B). With respect to this embodiment, only the components different from those of the first embodiment will be described, while omitting the descriptions on the same components as in the first embodiment which are denoted with the same reference numerals as in the first embodiment.

The method for manufacturing a solar cell according to the second embodiment is a method for continuously producing a plurality of power generation elements (solar cells) d, d . . . that are connected in series (i.e., solar cell module).

(1) Step for Charging Electrolyte 3

Figure 8A:
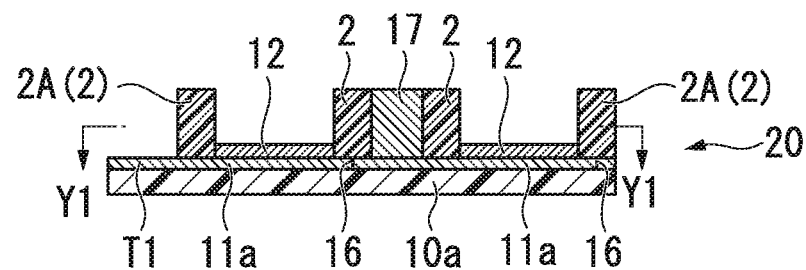
FIG. 8A is a schematic view showing one step of the method for manufacturing a solar cell according to one embodiment of the present invention, and showing the cross-section of a solar cell being manufactured.
Figure 8B:
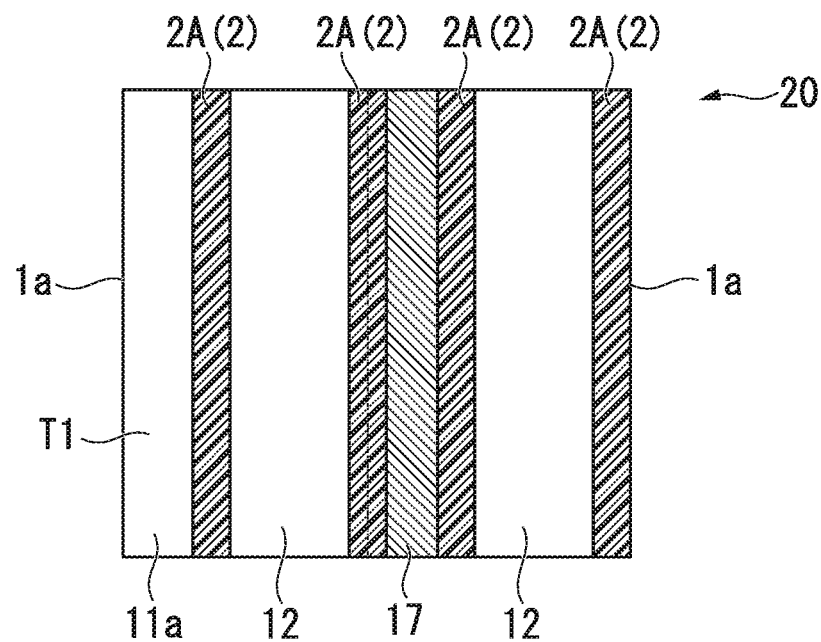
FIG. 8B is a cross-sectional view of a solar cell being manufactured as viewed from the arrow direction of the Y1-Y1 line of FIG. 8A.
Figure 9A:
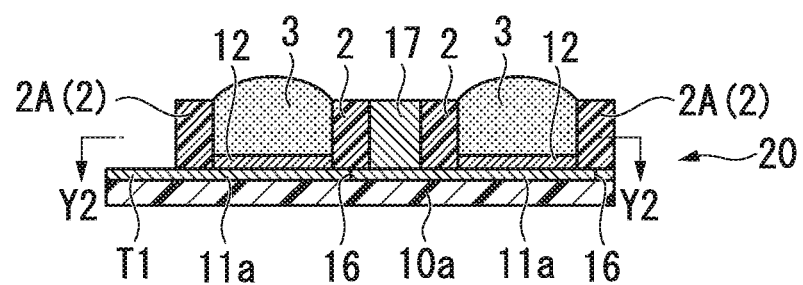
FIG. 9A is a schematic view showing one step of the method for manufacturing a solar cell according to one embodiment of the present invention, and showing the cross-section of a solar cell being manufactured.
Figure 9B:
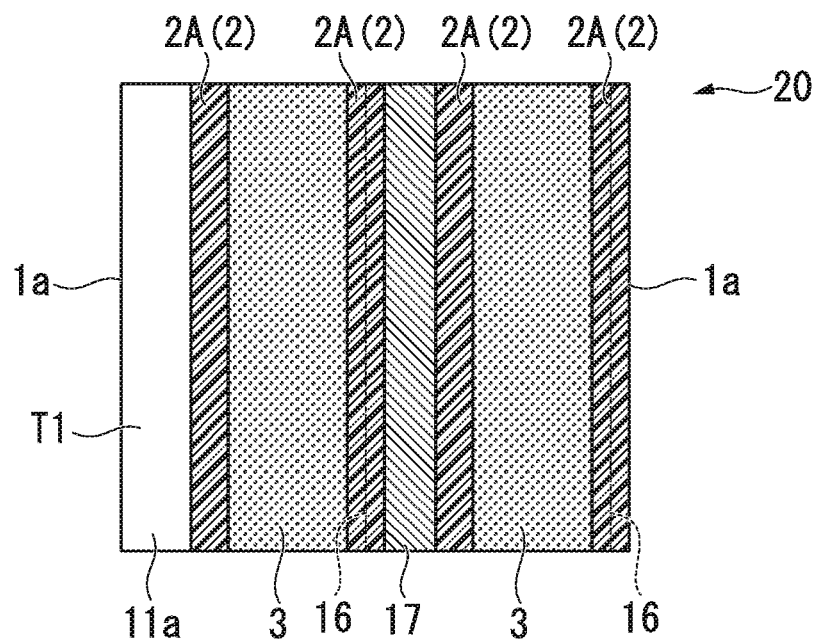
FIG. 9B is a cross-sectional view of a solar cell being manufactured as viewed from the arrow direction of the Y2-Y2 line of FIG. 9A.

In the step of supplying the electrolyte 3 according to the second embodiment, as shown in FIG. 8A and FIG. 8B, a plurality of long strip-formed conductive films 11a are formed on the substrate 10a, and the first electrode 20 used has semiconductor layers 12 formed on the surfaces of the respective conductive films 11a. Then, as shown in FIG. 9A and FIG. 9B, a pair of first sealing portions 2,2 . . . extending along two opposing lateral sides 1a,1a are formed at the widthwise ends of the respective conductive layers 11a (i.e., direction orthogonal to its longitudinal direction), and a liquid or semisolid electrolyte 3 is supplied to a region between the first sealing portions 2,2.

The substrate 10a has a long strip shape. More than one pair of the conductive film 11a and the semiconductor layer 12 (two pairs in this embodiment) are arranged next to each other in the widthwise direction of the substrate 10a.

Between the conductive films 11a, 11a, an insulating groove 16 extending along the direction of the lateral side 1a is formed.

The sealing materials 2A,2A are formed on both widthwise ends of one conductive film 11a such that one power generation element is formed on one conductive film 11a. The sealing material 2A on one widthwise end side (right side of the drawing in this embodiment) is formed on the insulating groove 16.

The electrolyte 3 is supplied to a region between the sealing materials 2A,2A (i.e., between the first sealing portions 2, 2) provided on the same conductive film 11a.

A conductive material 17 which serially connects the neighboring power generation elements is disposed between the sealing materials 2A,2A. Further, at the other widthwise end side of the substrate 10a, the substrate 10a having formed thereon the conductive film 11a is made to protrude out of the region between the first sealing portions 2,2, such that a terminal can be provided so as to extend from this protruding end T1.

(3) Step of Sealing Space S Filled with Electrolyte 3

As shown in FIG. 10A, FIG. 10B, FIG. 11A, and FIG. 11B, in the step of sealing the space S filled with the electrolyte 3, the second electrode 30 is laminated with the first electrode 20 in the same manner as described for the first embodiment. Then, the positions of the second sealing portions 7,7 provided with an interval as viewed in a longitudinal direction are set such that the hole 5 is provided at a position which is outside of the region between the second sealing portions 7,7. Thereafter, the first electrode 20 and the second electrode 30 are fusion-bonded to each other at the second sealing portion 7, and this portion is cut.

The second electrode 30 to be used has a plurality of strip-formed conductive films 11b,11b formed on the substrate 10 b. Between the conductive films 11b,11b, an insulating groove 18 for electrical insulation therebetween is formed.

Figure 10A:
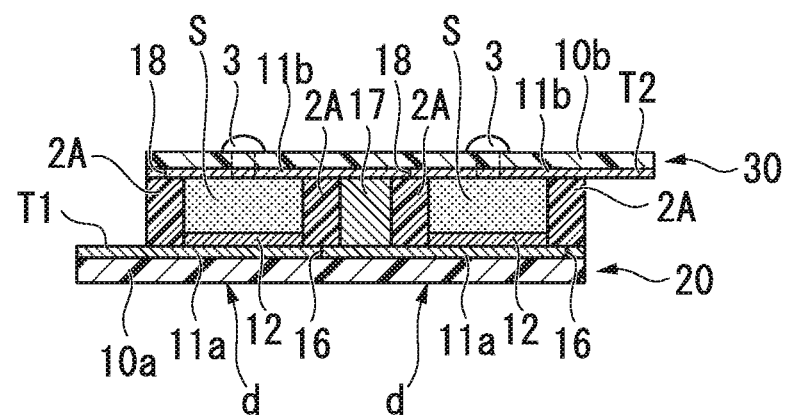
FIG. 10A is a schematic view showing one step of the method for manufacturing a solar cell according to one embodiment of the present invention, and showing the cross-section of a solar cell being manufactured.
Figure 10B:
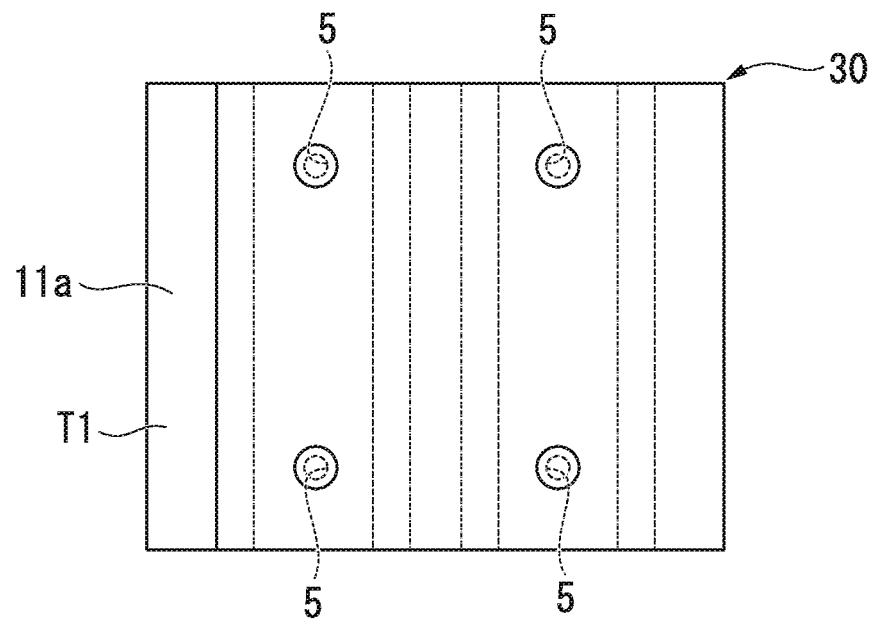
FIG. 10B is a cross-sectional view of a solar cell being manufactured as shown in FIG. 10A.

The insulating groove 18 of the second electrode 30 is, as shown in FIG. 10A, provided such that the insulating groove 18 contacts the sealing member 2A different from the sealing member 2A that is in contact with the insulating groove 16 of the first electrode 20. Further, one widthwise end of the substrate 10b is made to protrude out of the region between the first sealing portions 2,2, such that a terminal can be provided so as to extend from to this protruding end T2.

Thus, according to the method for manufacturing a solar cell of the second embodiment, besides the functions and effects described in connection with the first embodiment, it is possible to obtain an effect that a solar cell module having a plurality of power generation elements d,d can be efficiently manufactured with a continuous operation (i.e., by the so-called roll to roll method in which a rolled substrate is unwound and withdrawn at one end to be subjected to the process of each step, while winding the substrate into a roll on the other end to continue the operation).

The first and second embodiments of the present invention are as explained above; however, the present invention is not limited to those having specific elements as mentioned above in connection with the first and second embodiments, and any appropriate modifications can be made as long as such modifications do not deviate from the essence of the present invention.

Specifically, for example, in the first embodiment and the second embodiment of the present invention, the hole 5 may be provided at a position which is inside the region between the second sealing portions 7,7.

By this feature, it is possible to easily manufacture the solar cell by bonding at the second sealing portion 7 and sealing of the hole 5.

In each of the above embodiments, two or four circular holes are provided per one power generation element, but the shape and number of the hole may be appropriately chosen. Specifically, the diameter of the hole 5 may be such that the following relationship is satisfied: 30 µm≤diameter of the hole<distance between the first sealing portions 2, 2. Further, a plurality of holes 5 may be provided with intervals in the widthwise direction, or one continuous hole 5 may be formed so as to extend in the widthwise direction. Besides the circular shape, the hole 5 may have a polygonal shape, such as a triangular shape.

Figure 12A:
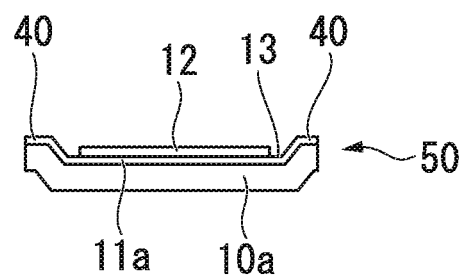
FIG. 12A shows an example of modification of each embodiment of the method for manufacturing a solar cell of the present invention.
Figure 12B:
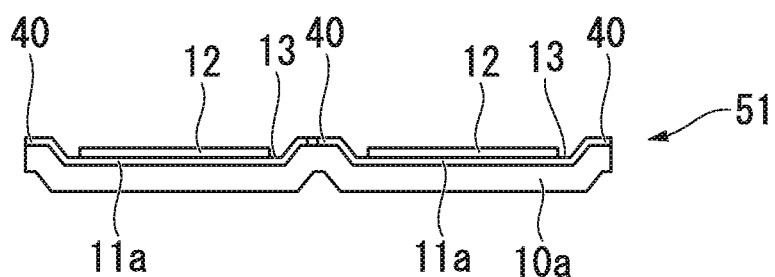
FIG. 12B shows another example of modification of each embodiment of the method for manufacturing a solar cell of the present invention.

Further, in each of the above embodiments, the first sealing portions 2,2 are formed only by placing the sealing members 2A,2A at both widthwise ends of the first electrode 20, but the first sealing portions 2 may be, as shown in FIG. 12A and FIG. 12B, formed with recesses 13,13 formed by raising both widthwise ends of the conductive film 3, flange portions 40, 40 capable of being bonded to the second electrode 30, and the sealing materials 2A,2A. The first sealing portion 2 formed in this manner enables the lamination of the first electrode 20 and the second electrode 30, while effectively preventing the overflow of the electrolyte 3 to be supplied to the first electrodes 50, 51 to outside of the region between the first sealing portions 2, 2.

In the first embodiment and the second embodiment, the first electrodes 1, 20 are photoelectrodes and the second electrodes 6, 30 are counter electrodes, but the second electrodes 6, 30 may be photoelectrodes, and the first electrodes 1, 20 may be counter electrodes.

The method for manufacturing a solar cell of the present invention can also be applied appropriately to the manufacture of solar cells connected in parallel.

Further, the bonding of the second sealing portions 7, 7 in the first embodiment and the second embodiment, and modifications thereof is preferably performed by ultrasonic welding, but may also be performed using an adhesive or the like.

Further, as for the first embodiment, when a terminal is provided so as to extend from the second sealing portion 7, the first sealing portion 2 may be formed only by a flange 40 shown in FIG. 12A, and the first electrode 50 may be bonded to the second electrode 6 by ultrasonic welding.

DESCRIPTION OF THE REFERENCE SIGNS

1,20 First electrode
1*a* Lateral side
2A First sealing portion
5 Hole
6 Second electrode
7 Second sealing portion
10*a*, 10*b* Substrate

The invention claimed is:

1. A method for producing a solar cell, comprising:
an electrolyte-supplying step of supplying an electrolyte onto a plate-shaped first electrode at a region thereof positioned between a pair of first sealing portions respectively provided along two opposing lateral sides of the plate-shaped first electrode;
an electrodes-laminating step of superposing a second electrode on the first electrode gradually from one end side toward the other end side as viewed in a direction along the lateral sides of the first electrode while bonding the second electrode to the first electrode at the first sealing portions, thereby obtaining a laminate,
the second electrode comprising a flexible plate-shaped substrate having a hole penetrating through the substrate in a thicknesswise direction thereof and capable of discharging the electrolyte therethrough; and
a sealing step of bonding the first electrode and the second electrode at a pair of second sealing portions which extend between the first sealing portions in a direction traversing the lateral sides of the first electrode and are provided with an interval as viewed in a direction along the lateral sides, thereby sealing a space filled with the electrolyte in the laminate,
the hole being provided at a position which is outside of a region between the second sealing portions.

2. The method according to claim 1, wherein, in the sealing step, the first electrode and the second electrode are bonded at the second sealing portions, and the resulting is cut while leaving at least a part of the second sealing portions.

3. The method according to claim 1, wherein the first sealing portions are sealing materials provided along the two opposing lateral sides of the plate-shaped first electrode.

4. The method according to claim 2, wherein the first sealing portions are sealing materials provided along the two opposing lateral sides of the plate-shaped first electrode.

* * * * *